Patented Nov. 1, 1938

2,135,064

UNITED STATES PATENT OFFICE 2,135,064

UREIDES CONTAINING A QUATERNARY CARBON ATOM

Frank C. Whitmore, State College, Pa., August H. Homeyer, St. Louis, Mo., and Clarence L. Noll, State College, Pa., assignors to Mallinckrodt Chemical Works, St. Louis, Mo., a corporation of Missouri No Drawing. Application February 17, 1936, Serial No. 64,338

4 Claims. (Cl. 260—553)

This invention relates to ureides, and with regard to certain more specific features, to ureides containing in their structure a quaternary carbon atom.

This application is in part a continuation of the application of the present inventors Whitmore and Homeyer, Serial No. 666,512, filed April 17, 1933, now Patent No. 2,034,850, dated March 24, 1936.

Among the several objects of the invention may be noted the provision, as new compositions of matter, of ureides corresponding to the type formula:

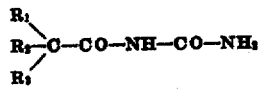

where $R_1$ is hydrogen or a halogen, $R_2$ is hydrogen or a hydrocarbon radical, and $R_3$ is a hydrocarbon radical containing a quaternary carbon atom; the provision of ureides corresponding to the type formula set forth which are valuable for their therapeutic effects; and the provision of processes for manufacturing ureides of the type set forth which produce products of a high degree of purity, and which may be carried out upon readily obtainable materials and with a minimum of complicated procedures. Other objects will be in part obvious and in part pointed out hereinafter.

The invention accordingly comprises the elements and combinations of elements, and features of composition which will be exemplified in the products hereinafter described, and the scope of the application of which will be indicated in the following claims.

It has recently been determined that certain organic products including as a constituent thereof, a carbon atom, that is, a carbon atom linked to four other carbon atoms, have valuable properties, particularly in the field of hypnotics, sedatives, soporifics, analgesics, bactericides, and the like. The ureides containing a quaternary carbon atom appear to have particular utility in the field of sedatives and soporifics, and possibly also hypnotics.

The present invention is particularly concerned with the production of ureides including a substituent group on the alpha-carbon atom of the ureide nucleus, said substituent group having such a quaternary carbon atom in its structure. So far as the present invention is concerned, the values or compositions of the other substituents on the alpha-carbon atom of the ureide nucleus, or, for that matter, the substituents on the nitrogen atoms of the ureide nucleus, are of little moment. These other substituents may be varied at will, within the skill of an organic chemist, and hence ureides so substituted are to be considered as included within the scope of the present invention.

A general method of manufacturing ureides corresponding to the type formula set forth comprises condensing urea with an acid corresponding in turn to the type formula:

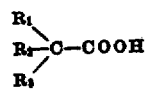

($R_1$, $R_2$, and $R_3$ having the same meaning as set forth hereinbefore) according to the reaction:

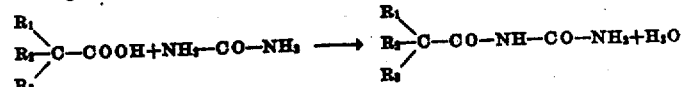

It is not infrequently more convenient to start with an acyl halide in place of the acid, the reaction then being:

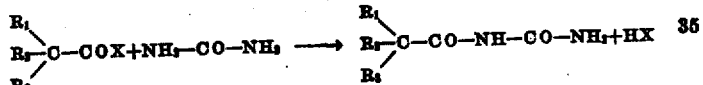

(X being a halogen atom, usually chlorine or bromine.)

In the examples set forth hereinafter, this basic process is carried through with a number of starting materials, yielding an exemplary number of substances. The particular substances disclosed are not, however, to be considered as defining strictly the limits of the invention; on the contrary, they will serve, to one skilled in the art, to indicate the possibility of preparing, by analogous methods, all of the various substances comprehended within the limits of the defined type formula.

EXAMPLE 1

*Tertiary butyl acetyl urea*

This is the simplest substance comprehended within the stated definitions of the type formula. Its formula is as follows:

from which it is seen that both $R_1$ and $R_2$ are hydrogen, while $R_3$ is the simplest possible alkyl group containing a quaternary carbon atom, namely, tertiary butyl, $(CH_3)_3C—$. It may be prepared by condensing urea and tertiary butyl acetyl chloride, according to the reaction:

Tertiary butyl acetyl chloride may be obtained in pure form by following the procedure outlined in the aforesaid Patent No. 2,034,850. Details of the procedure follow:

25.3 grams of tertiary butyl acetyl chloride are mixed with 25.3 grams of urea in a flask, and the flask is heated for two hours on a steam bath. Only a slight odor then remains. The solid product in the flask is then washed with 200 cc. of a 5% solution of sodium bicarbonate and 100 cc. of water, and thereafter air-dried on a Buchner funnel. After further drying in a desiccator, the solid product is recrystallized three times from ethyl acetate. The final recrystallized product, in the form of white crystals, has a melting point of 170° to 172° C.

Example 2

2,2-dimethylpropyl-methyl-acetyl urea

This substance has the following structural formula:

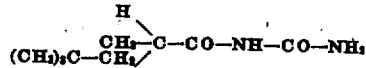

$R_2$ is now exhibited as methyl, while $R_3$ is 2,2-dimethylpropyl. This substance may be made by reacting 2,2-dimethylpropyl-methyl-acetyl chloride with urea, the reaction being analogous to that set forth in Example 1. Since the preparation of 2,2-dimethylpropyl-methyl-acetyl chloride is not elsewhere described, it will be given in detail hereinafter.

Tertiary butyl chloride, which is commercially obtainable, is used as the starting material. This is first converted into the corresponding Grignard compound, tertiary butyl magnesium chloride, by well-known methods. The Grignard compound is then reacted with allyl bromide, which is likewise commercially obtainable, according to the reaction:

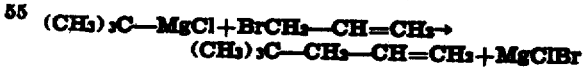

the product being the olefine, 4,4-dimethylpentene-1. This olefine is then hydrobrominated with hydrogen bromide in the presence of diphenylamine according to the reaction:

This bromide is then in turn reacted with magnesium to obtain its Grignard compound, and the Grignard compound thus obtained is reacted with carbon dioxide, according to the reaction:

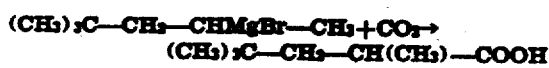

the product being 2,2-dimethylpropyl-methyl-acetic acid. This acid is next converted into the desired acetyl chloride with thionyl chloride, for example, by a well-known reaction. Details of this preparation follow.

Details for the preparation of the Grignard compound of tertiary butyl chloride are not given, as this is a customary procedure in organic syntheses.

Starting, then, with an ether solution of the Grignard compound, tertiary butyl magnesium chloride, the following procedure may be utilized:

605 grams of allyl bromide and 500 cc. of dry ethyl ether are placed in a three-neck flask equipped with a mechanical stirrer, a separatory funnel, and a thermometer. The mixture is cooled by ice and salt, and tertiary butyl magnesium chloride solution, which has been carefully filtered, is added at such a rate that the temperature remains near zero. A total of 2400 cc. of the Grignard reagent, which has a concentration of 2.2 mols per liter, is added during twenty-four hours. After warming to 30° C. for an hour, with stirring, the liquid is siphoned off into a funnel containing crushed ice. However, the magnesium halide ether complex forms a solid cake within the flask, so this is loosened with a stirring rod, slurried with ether, and added to the contents of the funnel. The ether layer is then separated from the water and washed with an ammoniacal solution of ammonium sulphate. The combined water layer and washings are steam distilled and the ether layer thus obtained is added to the main ether portion. The combined ether portions are then dried over calcium chloride, and fractionated, the portion boiling between 68° C. and 71.2° C., at atmospheric pressure, being collected as the product, 4,4-dimethylpentene-1. The amount collected is 419 grams, or a yield of 86% based upon the allyl bromide used. The product is a colorless liquid, having an index of refraction between 1.3902 and 1.3920.

The above olefine, before proceeding further, may be purified in the following manner: First, the olefine is converted into its dibromide with bromine in an ether or chloroform solution at −5° C. The dibromide is then fractionated at a reduced pressure, and the fraction from 77° C. to 78° C. (at 9 mm. pressure) is collected. The olefine is then regenerated by allowing the dibromide to flow drop-wise into a refluxing arrangement including a stirred suspension of zinc dust in ethyl alcohol, at boiling temperature. After this, the olefine is removed by usual methods from the alcoholic solution. The yield is greater than 90%. This procedure is particularly valuable for removing diallyl and other impurities from the crude olefine. The pure olefine has a boiling point of 72.35° C. at 760 mm. pressure, an index of refraction of 1.3911, and a density of 0.6827.

However, the olefine need not necessarily be purified at this stage.

200 grams of 4,4-dimethylpentene-1, prepared as above, are weighed into a one-liter, three-necked flask fitted with a Hopkins reflux condenser, a thermometer, a mercury-sealed stirrer, and a 50 cc. pipette delivery tube. 10.2 grams of diphenylamine are next added to the olefine, followed by a further 10.2 grams of diphenylamine in 200 grams of 75% acetic acid. The mixture is then cooled to −2° C. in a salt-ice bath. Hydrogen bromide, prepared by dropping liquid bromine on naphthalene and freed of bromine by passage over red phosphorous, is then passed into the olefine for three hours, after which the mixture is allowed to warm to room temperature and set over night. The addition of hydrogen bromide is then repeated for successive periods of, say, 8 hours, 6½ hours, and 6¼ hours, the mixture being allowed to warm to room temperature between the successive periods. A total of about 371 grams of hydrogen bromide is thus added. The mixture is then poured into a liter of ice water, whereupon diphenylamine hydrochloride precipitates and is filtered off. The oily bromide layer is then separated, washed with 200 cc. of water, and dried with a little calcium chloride. The water layer is steam distilled, and the small additional oily bromide layer is added to the main bromide separated. The bromide is then fractionated, two distinct products being collected. The lower boiling point fraction is the desired 4,4-dimethyl-2-bromo-pentane, which boils at 74.0° to 75.0° C., under 65 to 67 mm. pressure, and has an index of refraction of 1.4460 to 1.4462. The higher boiling point fraction is 4,4-dimethyl-1-bromopentane, which is not wanted for present purposes.

Next, 9 grams (0.3 mole) of magnesium turnings is weighed into a 500 cc. three-necked flask fitted with a mercury-sealed stirrer, a dropping funnel, and a reflux condenser. The top of the dropping funnel is connected to the reflux condenser and to a Gilman sulphuric acid trap. A few crystals of iodine are dissolved in 10 cc. of dry ethyl ether, and the solution is added to the magnesium in the flask. 5 grams of 4,4-dimethyl-2-bromopentane, prepared as above, is now added to the contents of the flask and the flask is warmed with matches. The reaction commences within 5 minutes after the addition of the bromide. 25 cc. of dry ethyl ether is next added to the contents of the flask, and thereafter, over a period of 2¼ hours, a solution of 55 grams of 4,4-dimethyl-2-bromopentane in 100 cc. of dry ethyl ether, is slowly added to the contents of the flask.

The resulting Grignard compound is cooled in an ice bath, and thereafter solid carbon dioxide is added to saturation. The solution is then decomposed by pouring it on ice. After making the solution acid with 25% sulphuric acid, the ether layer is allowed to separate and the water layer is steam-distilled, the ether fraction from the steam-distillate being added to the original ether fraction. The water layer is further extracted with successive 100 cc., 50 cc., and 50 cc. portions of ethyl ether, which are likewise added to the original ether fraction. The combined ether fractions are then dried with 10 grams of anhydrous sodium sulphate, and then distilled.

The resulting acid product, 2,2-dimethyl-propyl-methyl-acetic acid, boils at 108° to 108.5° C., under 14 mm. pressure, and has an index of refraction of 1.4227 to 1.4230, and a density of 0.9000.

21.1 grams of the acid are weighed into a 200 cc., three-necked flask fitted with a reflux condenser and a dropping funnel. 40 grams of thionyl chloride (SOCl₂) are then added in two hours, and the mixture is then heated on a steam bath for 5¼ hours, after which it is fractionated. The product, 2,2-dimethylpropyl-methyl-acetyl chloride, is a colorless liquid boiling at 102° to 103° C., under 117 to 118 mm. pressure, and has an index of refraction of 1.4307 to 1.4310, and a density of 0.9454.

4.8 grams of this acetyl chloride are mixed with 3 grams of urea in a 50 cc. Erlenmeyer flask, and the mixture is heated on a steam bath for about 3 hours, then allowed to stand over night, and then returned to the steam bath for a further 2 hours. The product is washed with 70 cc. of 5% sodium bicarbonate solution, filtered, and washed with water, and thereafter recrystallized from 95% ethyl alcohol and dried in a vacuum desiccator at 100 to 150 mm. pressure.

The product, 2,2-dimethylpropyl-methyl-acetyl urea, is a white crystalline solid melting at 177° to 178° C.

EXAMPLE 3

*3,3-dimethylbutyl-ethyl-acetyl urea*

This substance has the following structural formula:

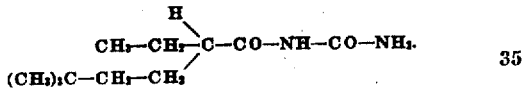

R₂ is now exhibited as ethyl, while R₃ is 3,3-dimethybutyl. This substance may be made by reacting 3,3-dimethylbutyl-ethyl-acetyl chloride with urea, the reaction being analogous to that set forth in Example 1.

3,3-dimethylbutyl-ethyl-acetyl chloride may be made by acylization of the corresponding acid, which acid may in turn be made from the malonic ester, 2,2-dimethyl-5,5-dicarbethoxy-heptane (the preparation of which is described in detail in the copending application of the present applicants Whitmore and Noll, together with David M. Jones, Serial No. 63,212, filed February 10, 1936) by well-known processes, according to the following series of reactions:

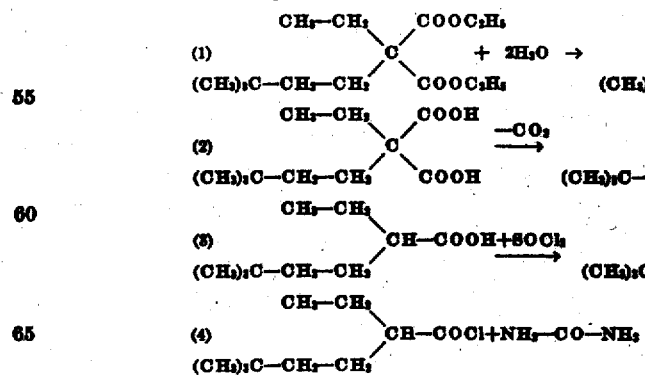

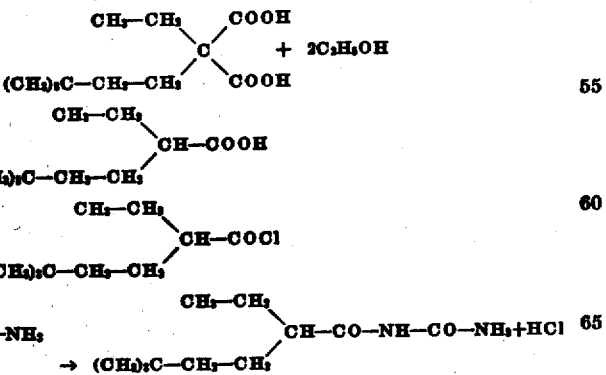

Reaction (1) is accomplished, for example, by refluxing the ester with potassium hydroxide, and reaction (2) proceeds merely with the aid of heat. Reactions (3) and (4) are analogous to those given in detail in connection with Example 2 of this application, and hence will not be repeated in detail herein.

The product ureide is a white crystalline solid.

EXAMPLE 4

4,4-dimethylpentyl-ethyl-acetyl urea

This substance has the following structural formula:

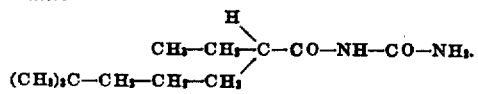

$R_2$ is again exhibited as ethyl, while $R_3$ is 4,4-dimethylpentyl. This substance may be made by reacting 4,4-dimethylpentyl-ethyl-acetyl chloride with urea, the reaction being analogous to that set forth in Example 1.

4,4-dimethylpentyl-ethyl-acetyl chloride may be made from the malonic ester, 2,2-dimethyl-6,6-dicarbethoxyoctane (the preparation of which is described in detail in said copending application Serial No. 63,212) according to reactions analogous to those set forth in connection with Example 3 herein.

The acid obtained in the course of this synthesis, 4,4-dimethylpentyl-ethyl-acetic acid, is a colorless liquid boiling at 103°–105° C., under 1 to 2 mm. pressure, and has an index of refraction of 1.4320 to 1.4328.

The product ureide is a white crystalline solid melting at 118° to 119° C.

EXAMPLE 5

4,4-dimethylhexyl-ethyl-acetyl urea

This substance has the following structural formula:

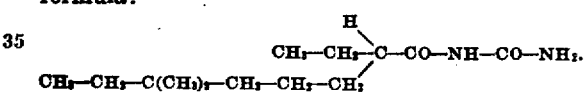

$R_2$ is again exhibited as ethyl, while $R_3$ is a new form of quaternary carbon-containing alkyl (the quaternary atom having two methyl groups and one ethyl group attached, in place of three methyl groups as heretofore). This substance may be prepared by reacting 4,4-dimethylhexyl-ethyl-acetyl chloride with urea, the reaction being analogous to that set forth in Example 1.

4,4-dimethylhexyl-ethyl-acetyl chloride may be made from the malonic ester, 3,3-dimethyl-7,7-dicarbethoxynonane (the preparation of which is described in detail in the said copending application Serial No. 63,212) according to reactions analogous to those set forth in connection with Example 3 herein.

The product ureide is a white crystalline solid.

EXAMPLE 6

4,4-dimethylpentyl-phenyl-acetyl urea

This substance has the following structural formula:

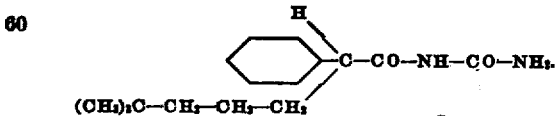

$R_2$ is now exhibited as phenyl (an aryl), while $R_3$ is 4,4-dimethylpentyl, as in Example 4. This substance may be made by reacting 4,4-dimethylpentyl-phenyl-acetyl chloride with urea, the reaction being analogous to that set forth in Example 1.

4,4-dimethylpentyl-phenyl-acetyl chloride may be made from the malonic ester, 1,1-dicarbethoxy-1-phenyl-5,5-dimethylhexane (the preparation of which is described in detail in the said copending application Serial No. 63,212) according to reactions analogous to those set forth in connection with Example 3 herein.

The product ureide is a white crystalline solid.

In all of the foregoing examples, $R_1$ has uniformly been hydrogen. In subsequent Examples 7 and 8, $R_1$ is exhibited as bromine, a halogen.

EXAMPLE 7

Alpha-bromo tertiary butyl acetyl urea

This substance has the following structural formula:

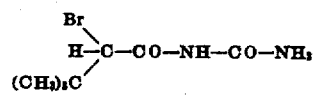

$R_1$ is exhibited as bromine, $R_2$ as hydrogen, and $R_3$ as tertiary butyl. This substance may be made by reacting alpha-bromo tertiary butyl acetyl bromide (described and claimed in the copending application of the present applicants Whitmore and Homeyer, Serial No. 666,512, filed April 17, 1933) with urea, the reaction being analogous to that set forth in Example 1.

The product ureide is a white crystalline solid, having a melting point of about 188.5° C.

An alternative method of making this ureide is to react urea with alpha-bromo tertiary butyl acetic acid, under suitable conditions. Since alpha-bromo tertiary butyl acetic acid is not elsewhere described, its preparation is given in detail hereinafter:

23 grams of tertiary butyl acetic acid (prepared as set forth in Whitmore et al. Patent No. 2,004,066, dated June 4, 1935) and 13 cc. of dry bromine (a 10% excess) are placed in a 200 cc. flask fitted with a reflux condenser arranged for collecting the evolved hydrogen bromide in water. One cc. of phosphorus trichloride is added and the mixture is warmed at 60° to 70° C. for three hours and then at 100° C. for an hour. Hydrogen bromide is evolved and all of the bromine disappears. The mixture is then distilled at a reduced pressure (4.5 mm.), yielding 21 grams of alpha-bromo tertiary butyl acetic acid, which is a white crystalline solid melting at 72° to 73° C., and boiling at 102° to 109° C., under 2 to 4 mm. pressure.

EXAMPLE 8

2,2-dimethylpropyl-methyl-alpha-bromoacetyl urea

This substance has the following structural formula:

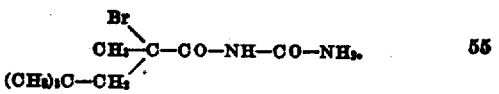

It is the same as the substance of Example 2, except in that $R_1$ is bromine instead of hydrogen. It is made by the same method as Example 2, except that a 2,2-dimethylpropyl-methyl-alpha-bromoacetyl halide is used in place of the 2,2-dimethyl-propyl-methyl-acetyl chloride of Example 2.

2,2-dimethylpropyl-methyl-alpha-bromoacetyl halides may be made from 2,2-dimethylpropyl-methyl-acetyl chloride in the following manner: 134.6 grams of the latter substance are placed in a 500 cc., three-necked flask fitted with a reflux condenser and a dropping funnel. 20 drops of phosphorus tribromide are then added to the flask, and thereafter, over a period of 1½ hours, 132 grams of liquid bromine are added. The reaction mixture is then heated on a steam bath for 8½ hours, and then fractionated. The bromoacetyl halide obtained, probably the chloride, is a colorless liquid boiling at 107.5° to 110.0° C. under 16 mm. pressure, and has an index of refraction of 1.5050 to 1.5053.

The ureide product obtained is a white crystalline solid melting at 138.7° to 139.7° C.

It is obvious that other alpha-brominated ureides can be prepared within the type formula set forth, by analogous methods.

Throughout this application, temperatures are given in degrees centigrade, pressure, in millimeters of mercury, indices of refraction with respect to the sodium-D line at 20° C., and densities at 20° C. with respect to water at 4° C.

In view of the above, it will be seen that the several objects of the invention are achieved and other advantageous results attained.

As many changes could be made in carrying out the above compositions and processes without departing from the scope of the invention, it is intended that all matter contained in the above description shall be interpreted as illustrative and not in a limiting sense.

We claim:

1. A ureide corresponding to the type formula:

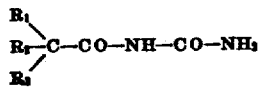

where $R_1$ is one of the group consisting of hydrogen and the halogens, $R_2$ is one of the group consisting of hydrogen, the lower alkyls, and phenyl, and $R_3$ is an alkyl containing a quaternary carbon atom in its structure.

2. 2,2-dimethylpropyl-methyl-acetyl urea.
3. Alpha-bromo tertiary butyl acetyl urea.
4. 2,2-dimethylpropyl - methyl - alpha - bromoacetyl urea.

FRANK C. WHITMORE.
AUGUST H. HOMEYER.
CLARENCE I. NOLL.

CERTIFICATE OF CORRECTION.

Patent No. 2,135,064.    November 1, 1938.

FRANK C. WHITMORE, ET AL.

It is hereby certified that error appears in the printed specification of the above numbered patent requiring correction as follows: Page 2, first column, line 22, for "flack" read flask; and second column, line 41, for the numeral "1.8902" read 1.3902; and that the said Letters Patent should be read with this correction therein that the same may conform to the record of the case in the Patent Office.

Signed and sealed this 24th day of January, A. D. 1939.

Henry Van Arsdale (Seal)    Acting Commissioner of Patents.

acetyl halide obtained, probably the chloride, is a colorless liquid boiling at 107.5° to 110.0° C. under 16 mm. pressure, and has an index of refraction of 1.5050 to 1.5053.

The ureide product obtained is a white crystalline solid melting at 138.7° to 139.7° C.

It is obvious that other alpha-brominated ureides can be prepared within the type formula set forth, by analogous methods.

Throughout this application, temperatures are given in degrees centigrade, pressure, in millimeters of mercury, indices of refraction with respect to the sodium-D line at 20° C., and densities at 20° C. with respect to water at 4° C.

In view of the above, it will be seen that the several objects of the invention are achieved and other advantageous results attained.

As many changes could be made in carrying out the above compositions and processes without departing from the scope of the invention, it is intended that all matter contained in the above description shall be interpreted as illustrative and not in a limiting sense.

We claim:

1. A ureide corresponding to the type formula:

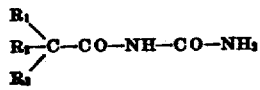

where $R_1$ is one of the group consisting of hydrogen and the halogens, $R_2$ is one of the group consisting of hydrogen, the lower alkyls, and phenyl, and $R_3$ is an alkyl containing a quaternary carbon atom in its structure.

2. 2,2-dimethylpropyl-methyl-acetyl urea.
3. Alpha-bromo tertiary butyl acetyl urea.
4. 2,2-dimethylpropyl - methyl - alpha - bromo-acetyl urea.

FRANK C. WHITMORE.
AUGUST H. HOMEYER.
CLARENCE I. NOLL.

CERTIFICATE OF CORRECTION.

Patent No. 2,135,064.                                    November 1, 1938.

FRANK C. WHITMORE, ET AL.

It is hereby certified that error appears in the printed specification of the above numbered patent requiring correction as follows: Page 2, first column, line 22, for "flack" read flask; and second column, line 41, for the numeral "1.8902" read 1.3902; and that the said Letters Patent should be read with this correction therein that the same may conform to the record of the case in the Patent Office.

Signed and sealed this 24th day of January, A. D. 1939.

Henry Van Arsdale (Seal)                                          Acting Commissioner of Patents.